United States Patent
Heo et al.

(10) Patent No.: US 8,150,880 B2
(45) Date of Patent: Apr. 3, 2012

(54) AUDIO DATA PLAYER AND METHOD OF CREATING PLAYBACK LIST THEREOF

(75) Inventors: U-Beom Heo, Seoul-si (KR); Jeong-Hee Ahn, Suwon-si (KR); Kyung-Wook Park, Yongin-si (KR); Joo-Ho Lee, Seoul-si (KR)

(73) Assignee: LG Electronics Inc., Seoul (KR)

( * ) Notice: Subject to any disclaimer, the term of this patent is extended or adjusted under 35 U.S.C. 154(b) by 499 days.

(21) Appl. No.: 12/203,287

(22) Filed: Sep. 3, 2008

(65) Prior Publication Data

US 2009/0062949 A1 Mar. 5, 2009

(30) Foreign Application Priority Data

Sep. 3, 2007 (KR) .......................... 10-2007-0089127

(51) Int. Cl.
*G06F 17/30* (2006.01)

(52) U.S. Cl. ......... 707/791; 707/802; 707/822; 707/828
(58) Field of Classification Search .......... 707/600–831
See application file for complete search history.

(56) References Cited

U.S. PATENT DOCUMENTS 7,930,305 B2 * 4/2011 Rekimoto ..................... 707/750
2007/0276866 A1 * 11/2007 Bodin et al. ............... 707/104.1

* cited by examiner

*Primary Examiner* — Isaac M Woo
(74) *Attorney, Agent, or Firm* — KED & Associates, LLP

(57) ABSTRACT

An audio data player may include a storage unit for storing one of more sound source files containing tag information, and an extraction unit for extracting one piece of information among the tag information (e.g., information on artist, album, title, year, genre, and user preference) of the stored sound source files. A control unit may provide the tag information of each sound source file extracted by the extraction unit in the form of a list, receiving one element of the provided list, and create a playback list.

17 Claims, 10 Drawing Sheets

Title : Moon river

Moon river, wider than a mile

AUDIO DATA PLAYER AND METHOD OF CREATING PLAYBACK LIST THEREOF

The present application claims priority from Korean Patent Application No. 10-2007-0089127, filed Sep. 3, 2007, the subject matter of which is incorporated herein by reference.

BACKGROUND

1. Field

Embodiments of the present invention may relate to an audio data player and a method of creating a playback list thereof.

2. Background

Portable audio data players capable of playing back audio data encoded in a digital format may be used. Handheld apparatuses of a comparatively small size capable of processing audio data encoded in a digital format and stored in a semiconductor memory apparatus have become popular. Moreover, as demands on further higher data storage capacity in the portable audio data players are increased, next-generation players including a miniaturized high-capacity hard drive are developed and getting popular.

Digital audio data may be loaded in an audio data player by downloading the digital audio data from audio CDs, the Internet, or other digital audio apparatuses.

The audio data may be decompressed and decoded by the audio data player according to a selected encoding format while being played back. A variety of encoding formats can be used to compress and decompress audio data.

In case of an audio data file encoded in an MP3 format, a special frame set called as ID3 tag may be added to a head or a tail of the data file. The ID3 tag may contain description text and other data related to the audio data file. For example, the tag may contain a title, an artist, an album, a year, comments, and genre. The ID3 tag information may be useful to search for, classify, and select a specific audio data file based on the information in the ID3 tag. Since the ID3 tag information is frequently stored as text characters, the information can be displayed on the display screen of the audio data player.

PC-based audio data file management programs allow a user to create and edit a playback list. The playback list may be downloaded in a portable audio data player and can be used to play back a series of selected audio data files. An M3U playback list is a kind of playback list formed as such and is related to MP3 audio data files. The M3U playback list may include only a text file including a list where paths or positions of data audio files contained in the list are sequentially numbered. Accordingly, a playback list created in a PC and downloaded to an audio data player can be used to selectively play back a series of audio data files.

BRIEF DESCRIPTION OF THE DRAWINGS

Embodiments may be described in detail with reference to the following drawings in which like reference numerals refer to like elements and wherein.

DETAILED DESCRIPTION

Example embodiments of an audio data player will be explained in detail below with reference to the accompanying drawings. Hereinafter, it will be described that MP3 files and ID3 tag information are respectively used as examples of sound source files and tag information to clarify the explanation.

Figure 1:
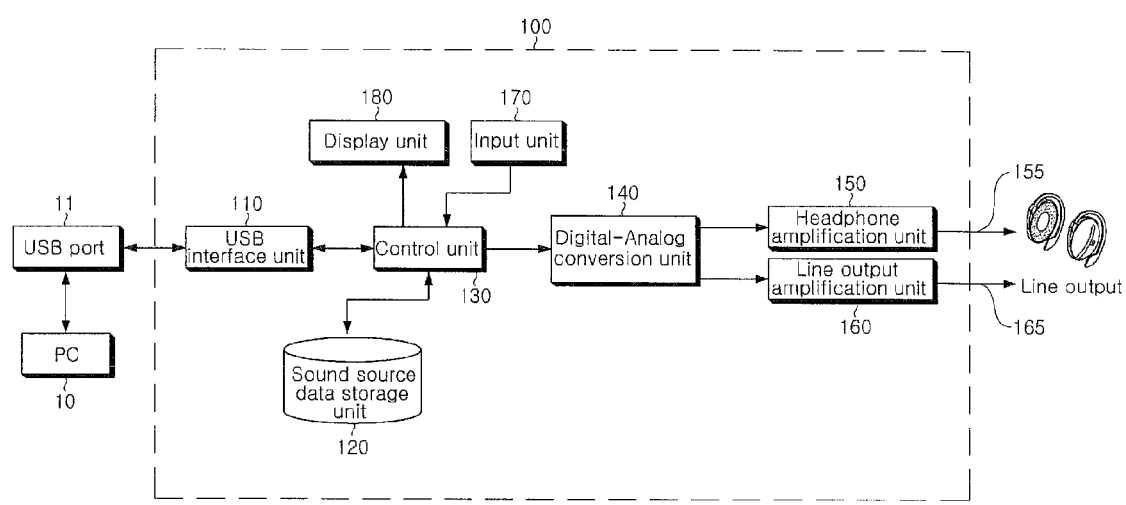
FIG. 1 is a block diagram showing an internal configuration of an audio data player according to an example embodiment of the present invention.
Figure 2:
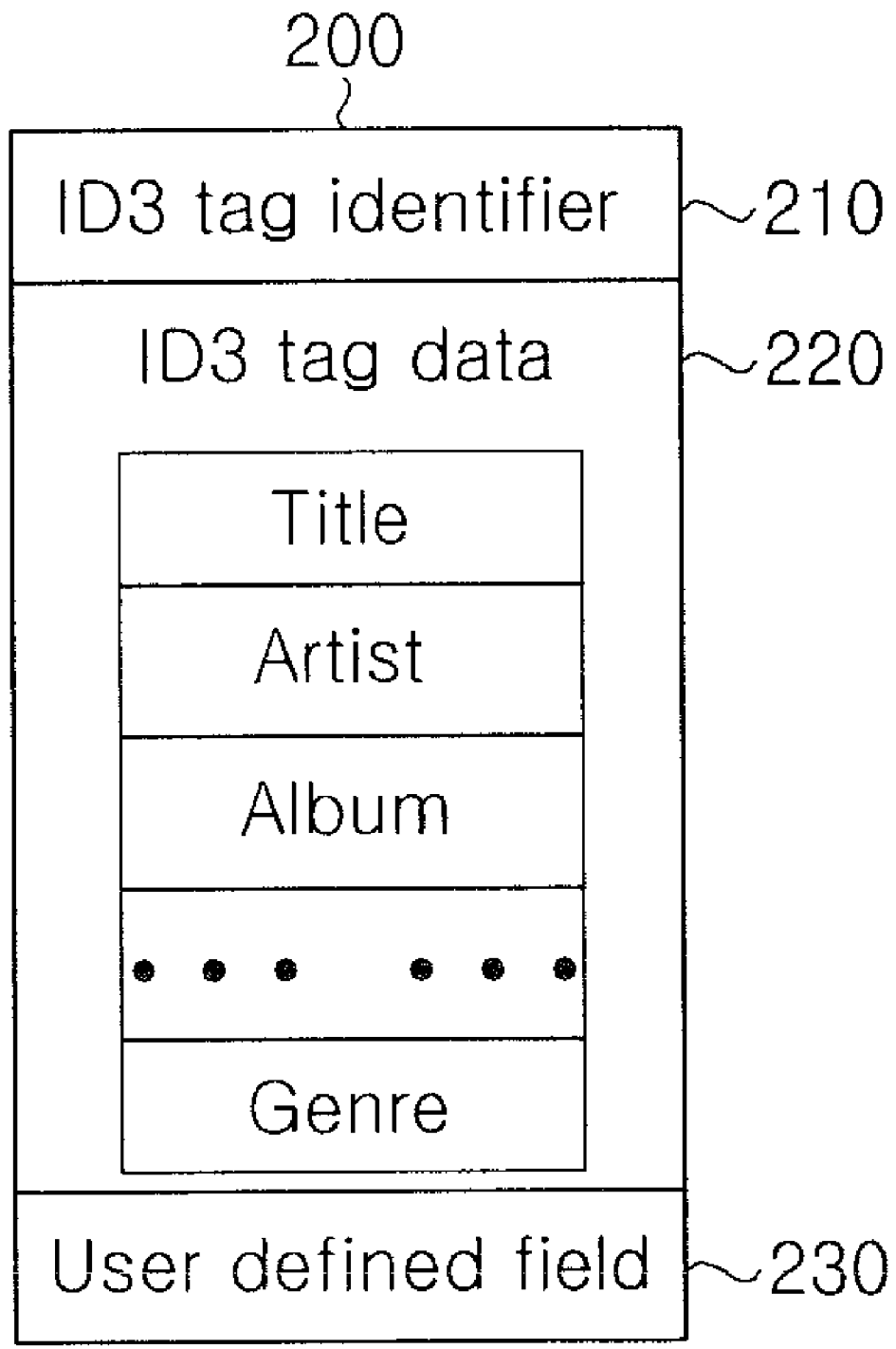
FIG. 2 is a view illustrating configuration of an ID3 tag of an MP3 file according to an example embodiment of the present invention.
Figure 3:
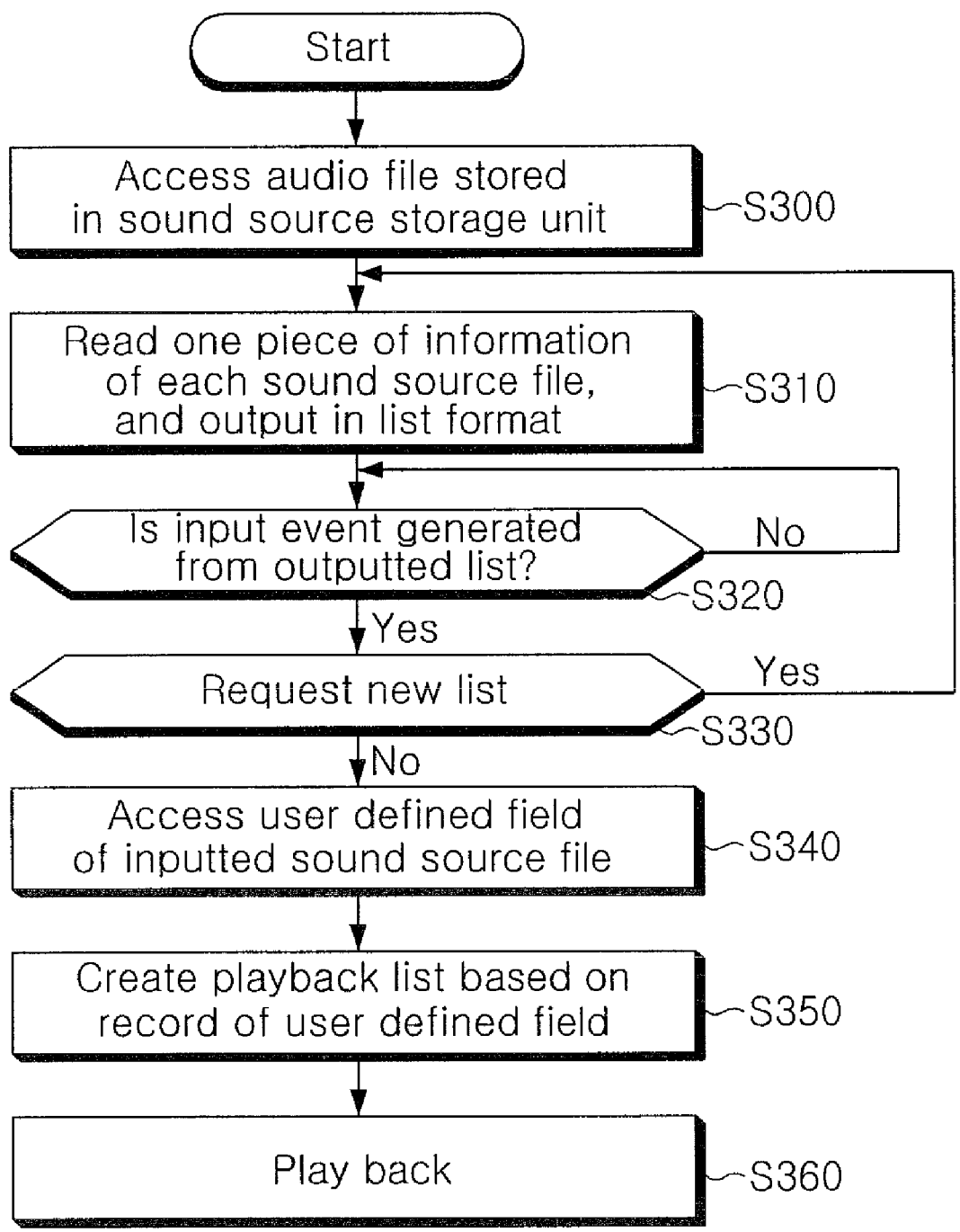
FIG. 3 is a flowchart illustrating a method of creating a playback list of an audio data player according to an example embodiment of the present invention.
Figure 4:
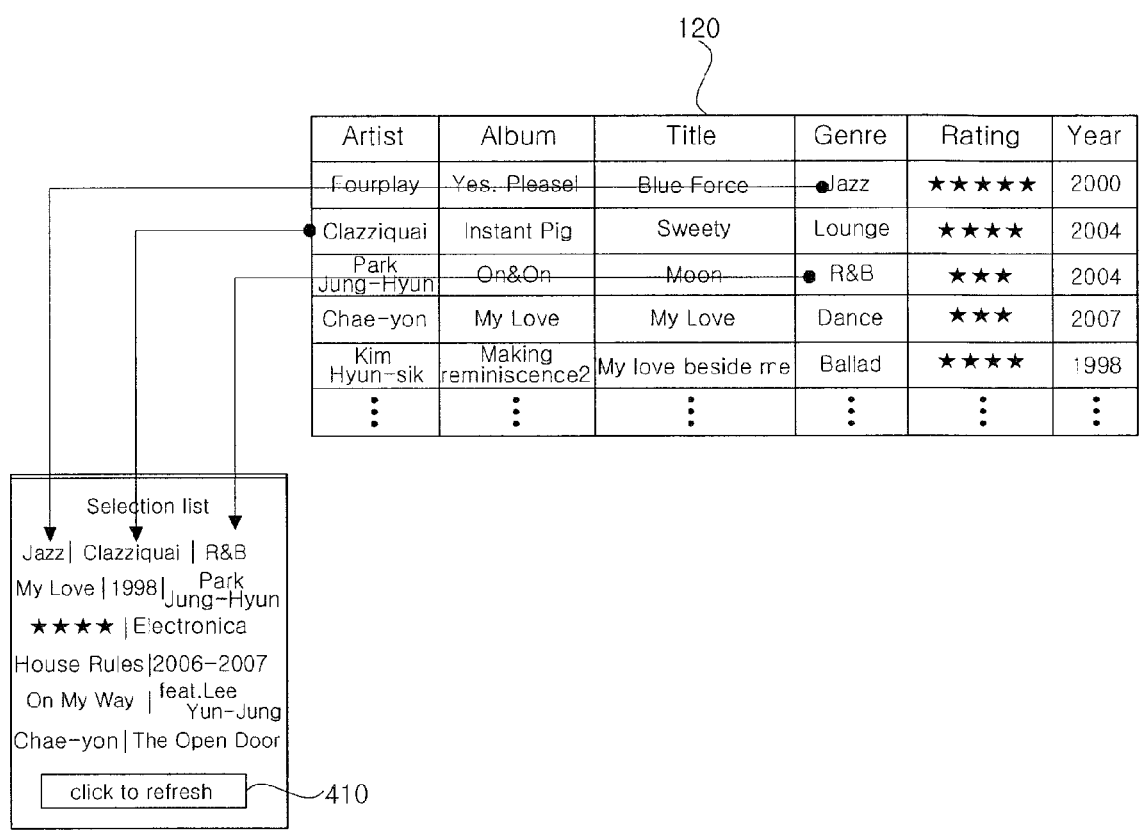
FIG. 4 is an exemplary view showing a user interface screen according to an example embodiment of the present invention.

FIG. 1 is a block diagram showing internal configuration of an audio data player according to an example embodiment of the present invention. FIG. 2 is a view illustrating configuration of an ID3 tag of an MP3 file according to an example embodiment of the present invention. FIG. 3 is a flowchart illustrating a method of creating a playback list of an audio data player according to an example embodiment of the present invention. FIG. 4 is an exemplary view showing a user interface screen according to an example embodiment of the present invention.

As shown in FIG. 1, audio data (hereinafter referred to as 'a sound source file') may be downloaded to an audio data player 100 from an external PC 10 using a USB port 11. The audio data player 100 may include a USB interface unit 110 for controlling communication with the USB port 11.

In addition, the audio data player 100 may include a sound source data storage unit 120 for storing one or more sound source files downloaded through the USB interface unit 110. The sound source data storage unit 120 may be a sound source file database configured in a form of a table of each sound source file. The sound source file database is shown in FIG. 4. The sound source file database may store ID3 tag information of each sound source file (e.g., information on artist, album, title, year, genre, and user preference). A variety of media, such as EEPROM, flash memory, external type memory, and the like, may be provided as the sound source data storage unit 120 depending on the capacity of data to be stored.

In addition, the audio data player 100 may include a control unit 130 for controlling overall operations of the audio data player 100, such as decoding sound source files stored in the sound source data storage unit 120. The control unit 130 may be a memory for storing various command sets and programs for controlling the audio data player 100.

The control unit 130 can be programmed to perform a variety of signal processing (e.g., decoding of an audio file, volume control, digital sound equalization, and sample conversion) while playing back a selected sound source file. The control unit 130 may be implemented in a microprocessor, digital signal processor (DSP), or the like.

The control unit 130 may detect a drive signal of the audio data player 100, and include an extraction unit for extracting information from among general information on an ID3 tag of each sound source file stored in the sound source file database (e.g., information on artist, album, title, year, and genre of a corresponding sound source file). Then, the control unit 130 may create a list (a selection list) of the extracted ID3 tag information (a keyword) of each sound source file and outputs the list on a display unit 180.

The control unit 130 provides the audio data player 100 with a user interface UI for receiving a piece of ID3 tag information of a sound source file desired to be played back while displaying a list of ID3 tag information of respective sound source files on the display unit 180 as shown in FIG. 4. The ID3 tag information may be displayed differently in font, shape, color, and the like depending on each outputted sound source file. The ID3 tag information may be distinguished, and the control unit 130 may emphasize the font and color of a tag of a song that is most frequently requested by the user and display it.

The control unit 130 accesses information on a playback pattern and a user preference stored in a certain area of the ID3 tag based on the received ID3 tag. The control unit 130 creates a playback list based on the accessed information.

The audio data player 100 may include a digital-analog conversion unit 140 for receiving decoded audio data stream from the control unit 130 and for processing the received audio data stream. The digital-analog conversion unit 140 converts digital signals into analog signals and provides the analog signals to a headphone amplification unit 150 and a line output amplification unit 160.

The headphone amplification unit 150 and the line output amplification unit 160 amplify the analog signals and provide the amplified analog signals to a headphone jack 155 or a line-out jack 165 installed at appropriate positions outside of the audio data player 100.

The audio data player 100 may include an input unit 170 for receiving a user's request. The input unit 170 may have icons or buttons capable of receiving various operations and menu settings for performing the above-mentioned functions. The input unit 170 can be configured as an input apparatus that includes a keypad or may be configured as a general display apparatus such as a liquid crystal display. The input unit 170 may also be provided as a touch panel capable of simultaneously performing input and display functions. In addition, the audio data player 100 may include the display unit 180. A liquid crystal display (LCD) may be used as the display unit 180.

FIG. 2 is a view illustrating a configuration of an ID3 tag of a sound source file according to an example embodiment of the present invention.

As shown in FIG. 2, an ID3 tag 200 includes areas for an ID3 tag identifier 210, ID3 tag data 220, and a user defined field 230. The ID3 tag identifier 210 uniquely identifies the ID3 tag. The ID3 tag identifier 210 may be a sequence of one or more characters for identifying a corresponding song of one sound source file. The ID3 tag data 220 may include general information (e.g., information on the artist, album, title, year, and genre of a corresponding MP3 file) of the sound source file. The ID3 tag of the sound source file can be edited through a variety of open programs. A user may input information desired by the user himself or herself in the user defined field 230. For example, the user defined field 230 may store his or her preference for the stored song or playback pattern information including information on a sound source file desired to be played back.

For example, if a sound source file is downloaded from the PC 10, a unique identifier may be assigned to the ID3 tag of the sound source file, and the ID3 tag data and playback pattern information of the user may be stored in corresponding areas of the ID3 tag.

A method of creating a playback list of the audio data player according to an example embodiment of the present invention will now be described.

Information on analysis of a user pattern on a sound source file may be previously stored in the ID3 tag 200 of a sound source file that is stored in the sound source data storage unit 120 of the audio data player 100.

An MP3 file in which user preference and playback pattern information of a corresponding song are recorded may be downloaded or received in the audio data player 100 using its own web browser (e.g., an UP browser, WAP browser, or AnyWeb browser) or a PC sync function.

The control unit 130 of the audio data player 100 may detect a drive signal of the audio data player 100. Then, the control unit 130 may access the sound source file database stored in the sound source data storage unit 120 (S300). General information on each sound source file (e.g., information on the artist, album, title, year, and genre of a corresponding MP3 file) may be stored in the sound source file database in a form of a table.

Thereafter, the extraction unit may extract a piece of ID3 tag information of each sound source file stored in the sound source file database. The control unit 130 may create a list of the ID3 tag information extracted from the sound source file and display the list on the display unit 180 (S310).

For example, as shown in FIG. 4, the display unit 180 outputs a piece of ID3 tag information of each sound source file. While ID3 tag information of a plurality of sound source files is displayed, a piece or item of ID3 tag information may be inputted through the input unit 170.

There may be some cases where information desired by the user is not included in the ID3 tag outputted in S310. In such a case, the user may press a refresh button 410 as shown in the display unit 180 of FIG. 4. The control unit 130 may detect a refresh signal in S330 and perform operations starting from S310. This is to receive a portion of the outputted tag and create a playback list based on the received tag, which controls to continuously refresh the playback list when an input event is not generated for the ID3 tag.

If an input event is detected for any one piece of the outputted ID3 tag information, the control unit 130 accesses the ID3 tag 200 of the detected input event. The control unit 130 accesses the user defined field 230 of the ID3 tag information in S340. The control unit 130 then creates a playback list in S350 based on the user preference or the playback pattern information stored in the user defined field 230.

The user preference information may be information on a preference selected and stored by a user for a corresponding song, which may be a fixed value set by the user or a value changed depending on a number of times that the corresponding song is played back by the user.

In addition, the playback pattern information may be recorded to have information on other songs related to the corresponding song, and also may be data stored by the user or updated by detecting songs played back together with the corresponding song (i.e., the songs contained in the playback list) when the corresponding song is played back.

Thereafter, the control unit 130 may decode the sound source file based on the created playback list and transfer a data stream of the sound source file to the digital-analog conversion unit 140. The digital-analog conversion unit 140 that receives the data stream converts digital signals to analog signals, amplifies the analog signals, and transfers the amplified signals to the headphone amplification unit 150 or the line output amplification unit 160. Accordingly, the amplified signals may be played in S360.

Figure 5:
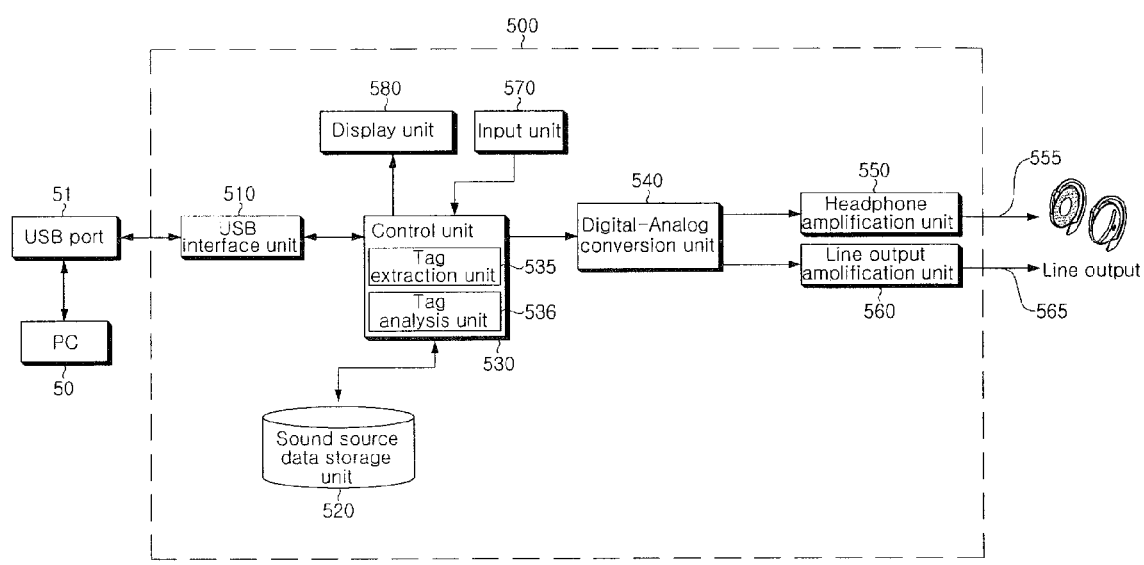
FIG. 5 is a block diagram showing an internal configuration of an audio data player according to another example embodiment of the present invention.
Figure 6:
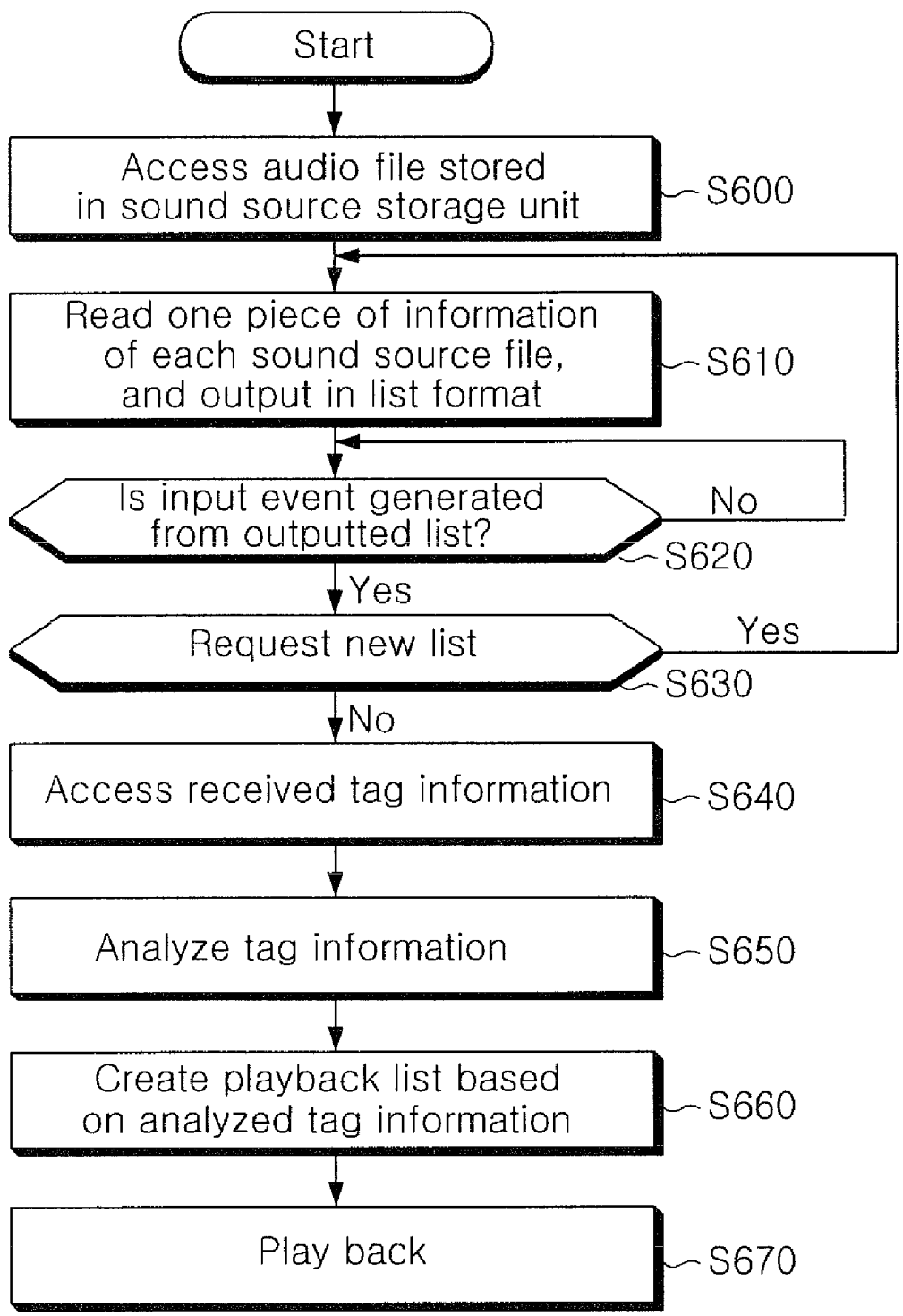
FIG. 6 is a flowchart illustrating a method of creating a playback list of an audio data player according to another example embodiment of the present invention.

FIG. 5 is a block diagram showing internal configuration of an audio data player according to another example embodiment of the present invention. FIG. 6 is a flowchart illustrating a method of creating a playback list of an audio data player according to the other example embodiment of the present invention.

This embodiment discussed with respect to FIGS. 5-6 is different from FIG. 1 in creating a playback list of sound source files. That is, a playback list may be created in the FIG. 1 embodiment by referring to the user defined field area of the ID3 tag, whereas in the FIG. 5 embodiment a playback list may be created using ID3 tag information of a sound source file inputted by a user.

The PC 50, the USB port 51, a USB interface unit 510, a digital-analog conversion unit 540, a headphone amplification unit 550, and a line output amplification unit 560 as shown in FIG. 5 may operate in a same way as the PC 10, the USB port 11, the USB interface unit 110, the digital-analog conversion unit 140, the headphone amplification unit 150, and the line output amplification unit 160 discussed above. Thus, descriptions thereof will be omitted for ease of discussion.

The audio data player 500 may include a control unit 530 for controlling overall operations of the audio data player 500, such as decoding sound source files stored in a sound source data storage unit 520. The control unit 530 may include a memory for storing programs and various command sets for controlling the audio data player 500.

The control unit 530 can be programmed to perform a variety of signal processing (e.g., decoding of an audio file, volume control, digital sound equalization, and sample conversion) while playing back a selected sound source file. The control unit 530 may be implemented in a microprocessor, digital signal processor (DSP), or the like.

The control unit 530 may detect a drive signal of the audio data player 500 and include a tag extraction unit 535 for extracting a piece of information from among general information on an ID3 tag of each sound source file stored in the sound source file database (e.g., information on artist, album, title, year, and genre of a corresponding sound source file). The control unit 530 may create a list of the ID3 tag information of each sound source file extracted by the tag extraction unit 535 and output the list on the display unit 580.

The control unit 530 may provide a user interface UI for receiving ID3 tag information of a sound source file desired to be played back in the audio data player 500 while displaying ID3 tag information of one or more sound source files on the display unit 580. Thereafter, a tag analysis unit 536 may access the received ID3 tag information, search for sound source files matching the received ID3 tag information, and create a playback list.

Functions of the tag extraction unit 535 and the tag analysis unit 536 may be performed by the control unit 530.

For example, general information on the sound source files stored in the ID3 tags of respective sound source files may be displayed on the display unit 580 as shown in FIG. 4. The user may select and input an ID3 tag of 'R&B' among the information displayed on the display unit 580. The control unit 530 may detect an input event of the 'R&B' and create a playback list by extracting sound source files of songs whose genre is 'R&B' from the sound source data storage unit 520. The control unit 530 may configure or create a playback list of songs that contain the selected ID3 tag.

FIG. 6 is a flowchart illustrating a method of creating a playback list of an audio data player according to the other example embodiment of the present invention.

The control unit 530 of the audio data player 500 may detect a drive signal of the audio data player 500. Then, the control unit 530 accesses the sound source file database stored in the sound source data storage unit 520 (S600).

The control unit 530 may randomly extract a piece of information stored in the ID3 tag data of each sound source file from among a plurality of pieces of sound source file information stored in the sound source file database. The control unit 530 may create a list of the extracted ID3 tag information and display the list on the display unit 580 (S610). While ID3 tag information of a plurality of sound source files is displayed, a piece of ID3 tag information can be inputted through an input unit 570 in S620.

There may be some cases where information desired by the user is not included in the ID3 tag outputted in S610. The user may press a refresh button 410 (FIG. 4) on the display unit 580. The control unit 530 may detect a refresh signal and control operations starting from S610 (S630).

If an input event is detected for any one of the outputted ID3 tags, the control unit 530 accesses the detected ID3 tag information (S640). Then, the control unit 530 analyzes the ID3 tag information (S650), searches for information matching the analyzed ID3 tag information, and creates a playback list (S660).

For example, when a user interface UI as shown in FIG. 4 is provided on the display unit 580, the user may select and input an ID3 tag of 'Park, Jung-Hyun'. The control unit 530 detects an input event of 'Park, Jung-Hyun', accesses sound source files matching to 'Park, Jung-Hyun' among the sound source files stored in the sound source data storage unit 520, and creates a playback list based on the matches.

The control unit 530 decodes the sound source file based on the created playback list and transfers a data stream of the sound source file to the digital-analog conversion unit 540. The digital-analog conversion unit 540 that receives the data stream converts digital signals to analog signals, amplifies the analog signals, and transfers the amplified signals to the headphone amplification unit 550 or the line output amplification unit 560 (S670). Accordingly, the amplified signals may be played in S670.

Figure 7:
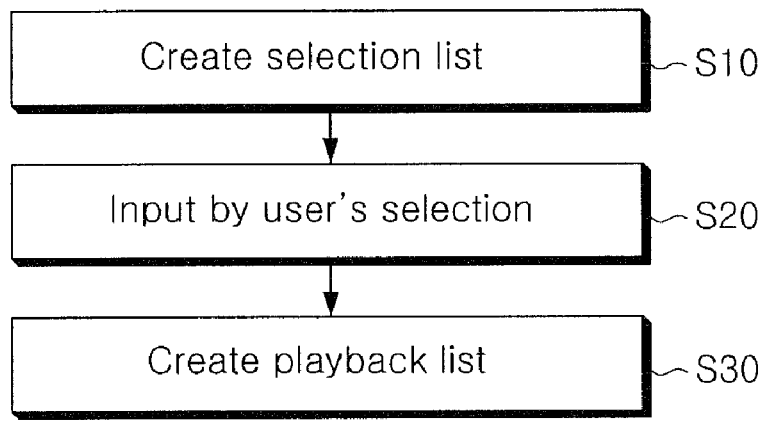
FIG. 7 is a flowchart schematically illustrating operation sequence of an example embodiment of the present invention.
Figure 9:
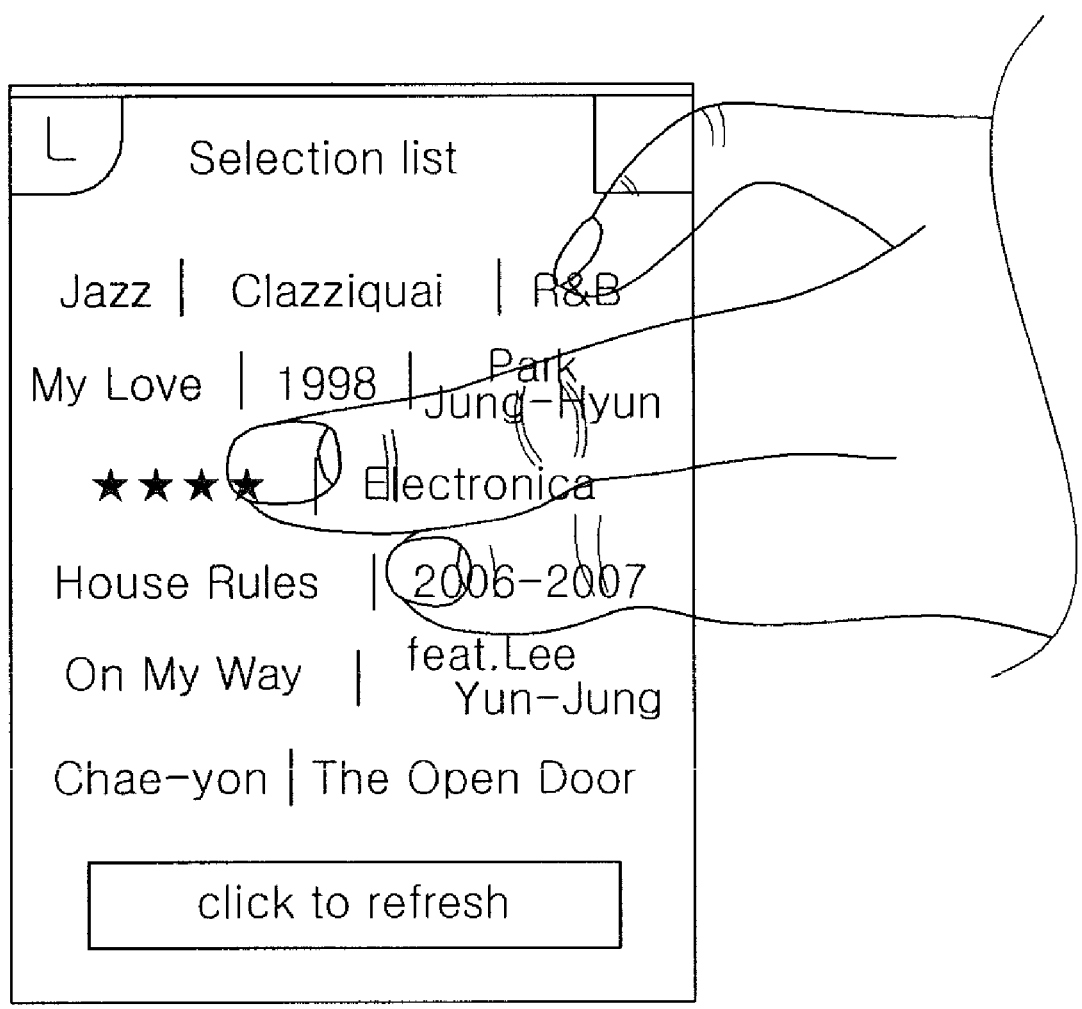
FIG. 9 is an exemplary view showing an example of receiving a search keyword from a selection list according to an example embodiment of the present invention.
Figure 10:
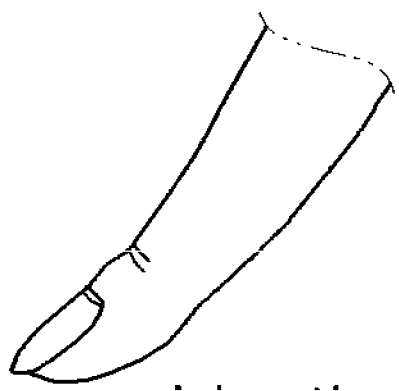
FIG. 10 is an exemplary view showing an example of receiving a search keyword from lyric information according to an example embodiment of the present invention.
Figure 11:
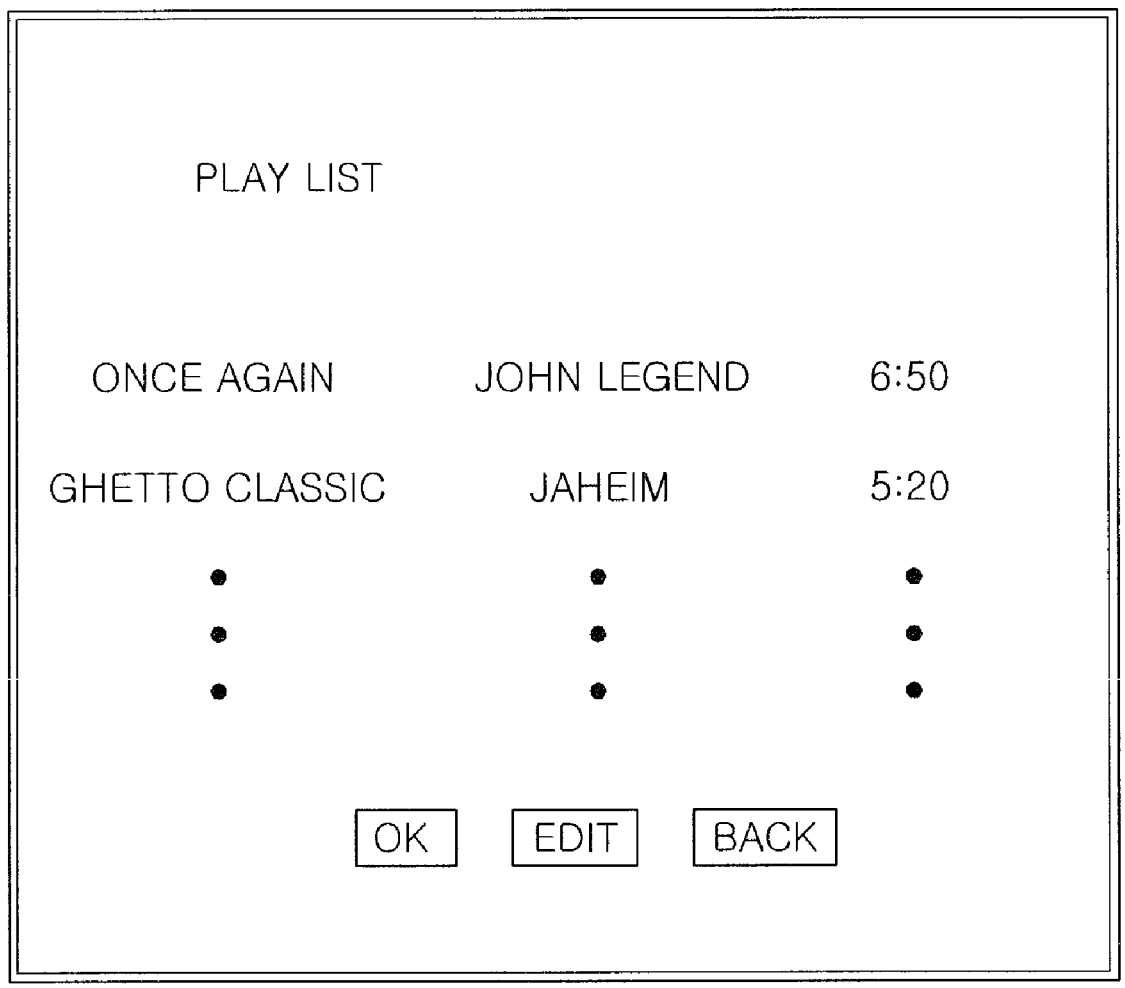
FIG. 11 is an exemplary view showing an example of a playback list created according to an example embodiment of the present invention.

FIG. 7 is a flowchart schematically illustrating an operation sequence of an example embodiment of the present invention. FIG. 9 is an exemplary view showing an example of receiving a search keyword from a selection list in an example embodiment of the present invention. FIG. 10 is an exemplary view showing an example of receiving a search keyword from lyric information in an example embodiment of the present invention. Additionally, FIG. 11 is an exemplary view showing an example of a playback list created according to an example embodiment of the present invention.

As shown in FIG. 7, in order to receive a keyword from a user, a selection list containing a variety of keywords may be created (S10).

Although an example of creating a selection list from the tag information of sound source files stored in the sound source file database has been described above, the selection list can be created and updated in a variety of methods.

The selection list may be transmitted from a web server and stored in the audio data player, or a user may create the selection list by selecting a keyword by himself or herself or edit to change a previously created selection list.

In case of a previously created and stored selection list, a weighting factor may be applied to each of the keywords in the selection list depending on the number of selections of the user. The selection list may be updated by selecting keywords having a higher weighting factor.

Figure 8:
FIG. 8 is an exemplary view showing an example of a selection list created according to an example embodiment of the present invention.

FIG. 8 shows an example of a created selection list. As shown, the selection list includes a plurality of keywords, and a refresh input area is provided in the selection list. If there is no keyword desired by the user, a new selection list may be presented as described above.

After the selection list is created in FIG. 7, the user selects one or more keywords among the keywords included in the selection list (S20).

As for the selection of the keywords, only one keyword may be selected, or a plurality of keywords may be selected using a multi-touch as shown in FIG. 9.

In selecting a plurality of keywords, although it is possible not to use a multi-touch method but rather to input a plurality of keywords through a separate 'Confirm' or 'Input' window after individually selecting a plurality of keywords, the multi-touch method may be used in order to reduce a number of touches by the user.

Keywords may also be received in another method without creating the selection list. That is, as shown in FIG. 10, when a lyric is displayed while a sound source file is played back, if one (or a plurality) phrase of the lyric is touched and inputted, the touched phrases can be recognized as a keyword.

This may be used when a user desires to conveniently create a playback list of songs related to specific words while playing back a song.

Although it is shown and described using a lyric as an example, if information is selected such as a title, an artist, an album, a genre, or the like displayed while a sound source file is played back, the information may be recognized as a keyword.

If keywords are inputted in a variety of methods as discussed above, a playback list may be created using keywords (S30).

Although the above described methods of creating a playback list may be the same in that tag information of each sound source file is used, the methods may also be divided into three methods described below depending on which part of the tag information is used.

The methods can be divided into i) a method of selecting sound source files where information that is the same as, similar to, or related to the selected keywords is contained in the contents of the tag data, using information stored in the tag data 220 of the tag information 200; ii) a method of selecting sound source files where information that is the same as, similar to, or related to the selected keywords is contained in the user defined field 230, using user preference or playback pattern information contained in the user defined field 230 of the tag information 200; and iii) a method of using both of the tag data 220 of the tag information and the user preference or playback pattern information contained in the user defined field 230 in which methods i) and ii) are combined.

FIG. 11 shows an example of a playback list created using such a method. More specifically, FIG. 11 shows an example of creating a playback list by searching for music files assigned with four stars ( ) by a user as preference among the R&B songs sold between 2006 and 2007 as shown in FIG. 9 when the user selects 'R&B', ' ', and '2006-2007' as keywords.

Embodiments of the present invention may provide an audio data player and a method of creating a playback list thereof, wherein a playback list created by considering user's tastes is provided using ID3 tag information of audio files.

Embodiments of the present invention may provide an audio data player that comprises a storage unit for storing one or more sound source files containing tag information; an extraction unit for extracting one piece of information among the tag information of the stored sound source files; and a control unit for providing the tag information of each sound source file extracted by the extraction unit in the form of a list, for receiving one element of the provided list, and for creating a playback list.

The tag may include a tag identifier, tag data, and a user defined field.

The tag data is preferably information on an artist, an album, a title, a year, or a genre of the sound source file.

User preference and playback pattern information of the sound source file may be recorded in the user defined field.

The control unit may detect input of any one element of the provided tag list and create a playback list using sound source files that include tag information matching tag information corresponding to an input event.

The control unit may search for sound source files containing the inputted tag information among the sound source files stored in the storage unit, and create the playback list to sequentially play back the searched sound source files.

The control unit may detect input of any one element of the provided tag list and create a playback list referring to user preference and playback pattern information stored in the user defined field of a tag corresponding to an input event.

The audio data player may include a display unit; an input unit for receiving an input from a user; a USB interface unit connected to an external PC to receive the sound source file; a digital-analog conversion unit for converting an audio data stream decoded by the control unit to analog signals; and an amplification unit for amplifying the analog signals converted by the digital-analog conversion unit.

The extraction unit may randomly extract one piece of information among the tag information.

Embodiments of the present invention may provide a method of creating a playback list that comprises: (A) extracting a piece of tag information for each sound source file from a plurality of sound source files stored in a sound source file database; (B) providing the extracted tag information of each sound source file in the form of a list; (C) receiving one element of the provided tag information list, and (D) creating a playback list based on an input event of receiving one element of the provided tag information list (C).

The tag information may be information on an artist, an album, a title, a year, or a genre of the sound source file.

Then, the extracting (A) may randomly extract one piece of information among a plurality of pieces of the tag information of each sound source file.

Creating the playback list (D) may include searching for sound source files containing tag information matching to the inputted tag information and creating the playback list referring to the sound source files.

Sound source files containing the inputted tag information may be searched for among the sound source files stored in the sound source file database, and the playback list may be created to sequentially play back the searched sound source files.

The tag information may further include a user defined field where user preference and playback pattern information of the sound source file are recorded.

Creating the playback list (D) may include accessing the user defined field of the inputted tag and create the playback list referring to the stored user preference and playback pattern information.

The method may include receiving a tag information list providing signal in addition to the provided tag information list.

When the tag information list providing signal is received in addition to the provided tag information list, the extracting, providing, receiving and creating may be performed.

A method of creating a playback list of an audio data player may include (A) providing a selection list including tag information of a sound source file; (B) allowing a search keyword to be selected from the selection list; and (C) creating a playback list based on the search keyword.

The selection list may be created from tag information of sound source files stored in a sound source file database.

The selection list may be created by randomly extracting information from the tag information of the sound source files.

In addition, the selection list may be created using tag information selected and stored by a user among the tag information of the sound source files.

The selection list may be received from a web server and stored in the audio data player.

The selection list may be created by reflecting a weighting factor from the tag information of the sound source file to which the weighting factor is assigned depending on a number of times the sound source file is selected by a user in (B).

At this time, the selection in (B) may be carried out by a touch input of a search keyword included in the selection list.

The touch input may be a multi-touch input for selecting one or more search keywords.

Embodiments of the present invention may provide a method of creating a playback list of an audio data player that includes (A) outputting lyric information or sound source information when a sound source file stored in a sound source file database is played back; (B) recognizing a specific phrase as a search keyword when a selection of the specific phrase is detected among the lyric information or sound source information; and (C) creating a playback list based on the search keyword.

The selection in (B) may be carried out by a touch input of a display position of the specific phrase among the displayed lyric information or sound source information.

The touch input may be a multi-touch input for selecting one or more specific phrases.

The playback list may be created by searching for sound source files containing tag information matching the inputted search keyword and referring to the sound source files.

The tag information may include a user defined field where user preference and playback pattern information of the sound source file may be recorded.

The playback list may be created by referring to the user preference and playback pattern information stored in the user defined field.

Since the audio data player creates a playback list by considering a user's tastes and plays back sound source files based on the playback list, embodiments may be advantageous in that desires of a variety of users can be satisfied.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A multimedia player, comprising:
a storage unit to store at least one source file that contains a tag;
an extraction unit to extract information from the tag of the stored source file;
a control unit to provide the tag information of at least two source files extracted by the extraction unit in a form of a selection list, to display the selection list that includes the tag information from the at least two source files, to receive an input regarding at least one element from the displayed selection list that includes the displaying of the tag information from the at least two source files, and to create a playback list based on the received input regarding the at least one element from the displayed selection list;
a multi-touch input unit to simultaneously receive a plurality of touches from a user; and
an input/output controller to detect touch inputs from the multi-touch input unit and to calculate touch positions,
wherein when the input/output controller detects the multi-touch input from the multi-touch input unit, the control unit recognizes that search keywords corresponding to the respective touch positions are selected.

2. The multimedia player as claimed in claim 1, wherein the tag includes a tag identifier, tag data and a user defined field.

3. The multimedia player as claimed in claim 2, wherein the tag data is information on an artist, an album, a title, a year, or a genre of the source file.

4. The multimedia player as claimed in claim 3, wherein the control unit detects the input regarding the at least one element from the displayed selection list and the control unit creates the playback list using source files that include the tag information that corresponds to the input.

5. The multimedia player as claimed in claim 4, wherein the control unit searches for source files containing the inputted tag information from among the source files stored in the storage unit, and the control unit creates the playback list to sequentially play back the searched source files.

6. The multimedia player as claimed in claim 2, wherein the user defined field of the tag includes user preference or playback pattern information of the source file.

7. The multimedia player as claimed in claim 6, wherein the control unit detects the input regarding the at least one element from the displayed selection list and the control unit creates the playback list by referring to the user preference and the playback pattern information in the user defined field of the tag corresponding to the input.

8. The multimedia player as claimed in claim 7, wherein the extraction unit extracts information from the tag by randomly extracting one piece of information from the tag.

9. A multimedia player, comprising:
a storage unit to store a plurality of source files that each contain a respective tag;
a control unit to provide first tag information extracted from a first one of the source files and to provide second tag information extracted from a second one of the source files, and the control unit to display the first tag information and the second tag information in a form of a selection list, the control unit to receive an input regarding one element from the displayed selection list that includes the first tag information and the second tag information, and the control unit to provide a playback list based on the received input regarding the one element from the displayed selection list, and
a multi-touch input unit to simultaneously receive a plurality of touches from a user, wherein the control unit to detect touch inputs from the multi-touch input unit and to calculate touch positions, and when the control unit detects the multi-touch input from the multi-touch input unit, the control unit recognizes that search keywords corresponding to the respective touch positions are selected.

10. The multimedia player as claimed in claim 9, wherein the tag includes a tag identifier, tag data and a user defined field.

11. The multimedia player as claimed in claim 10, wherein the tag data is information on an artist, an album, a title, a year, or a genre of the source file.

12. The multimedia player as claimed in claim 11, wherein the control unit detects the input regarding the one element from the displayed selection list, and the control unit provides the playback list using source files that include the tag information that corresponds to the input.

13. The multimedia player as claimed in claim 12, wherein the control unit searches for source files containing the inputted tag information from among the source files stored in the storage unit, and the control unit provides the playback list to sequentially play back the searched source files.

14. The multimedia player as claimed in claim 10, wherein the user defined field of the tag includes user preference or playback pattern information of the source file.

15. The multimedia player as claimed in claim 14, wherein the control unit detects the input regarding the one element from the displayed selection list, and the control unit provides the playback list referring to the user preference and the playback pattern information in the user defined field of the tag corresponding to the input.

16. The multimedia player as claimed in claim 15, wherein the control unit randomly extracts one piece of information from the tag.

17. A multimedia player, comprising:
a storage unit to store at least one source file that contains a tag;
an extraction unit to extract information from the tag of the stored source file;
a control unit to provide the tag information of each source file extracted by the extraction unit in a form of a list, to receive an input regarding at least one element from the list, and to create a playback list based on the received at least one element;
a multi-touch input unit to simultaneously receive a plurality of touches from a user; and
an input/output controller to detect touch inputs from the multi-touch input unit and to calculate touch positions, wherein when the input/output controller detects the multi-touch input from the multi-touch input unit, the control unit recognizes that search keywords corresponding to the respective touch positions are selected.

* * * * *